United States Patent [19]

Snook

[11] Patent Number: 4,884,249
[45] Date of Patent: Nov. 28, 1989

[54] MARINE STREAMER FOR USE IN SEISMIC SURVEYS

[75] Inventor: Clive T. Snook, Oegstgeest, Netherlands

[73] Assignee: GECO A.S., Sandvika, Norway

[21] Appl. No.: 220,675

[22] Filed: Jul. 18, 1988

[30] Foreign Application Priority Data

Jul. 27, 1987 [NO] Norway ................. 873149

[51] Int. Cl.⁴ .............................. G01J 1/00
[52] U.S. Cl. ..................... 367/154; 367/16; 114/253
[58] Field of Search ............... 181/110–112; 367/15–20, 106, 130, 144, 153, 154; 114/242–245, 249, 251, 253

[56] References Cited

U.S. PATENT DOCUMENTS

| 3,424,267 | 1/1969 | Babb | 367/20 |
| 3,480,907 | 11/1969 | King | 367/20 |
| 4,160,229 | 7/1979 | McGough | 367/20 |
| 4,313,392 | 2/1982 | Guenther et al. | 114/244 |
| 4,686,660 | 8/1987 | Gjestrum et al. | 367/153 |
| 4,721,180 | 1/1988 | Haughland et al. | 181/111 |

FOREIGN PATENT DOCUMENTS 150016 4/1984 Norway .
410126 9/1979 Sweden .

Primary Examiner—Brian S. Steinberger
Attorney, Agent, or Firm—Fleit, Jacobson, Cohn, Price, Holman & Stern

[57] ABSTRACT

In order to avoid noise and error-sources a marine streamer (3) for use in seismic exploration is provided with a buoyancy member (8) which is snake-shaped or tubular-shaped and slightly flexible and supports the active member (9) of the streamer by the aid of narrow suspension ropes (10). The streamer may be made adjustable as regards its height and it may be dividable into sections.

10 Claims, 2 Drawing Sheets

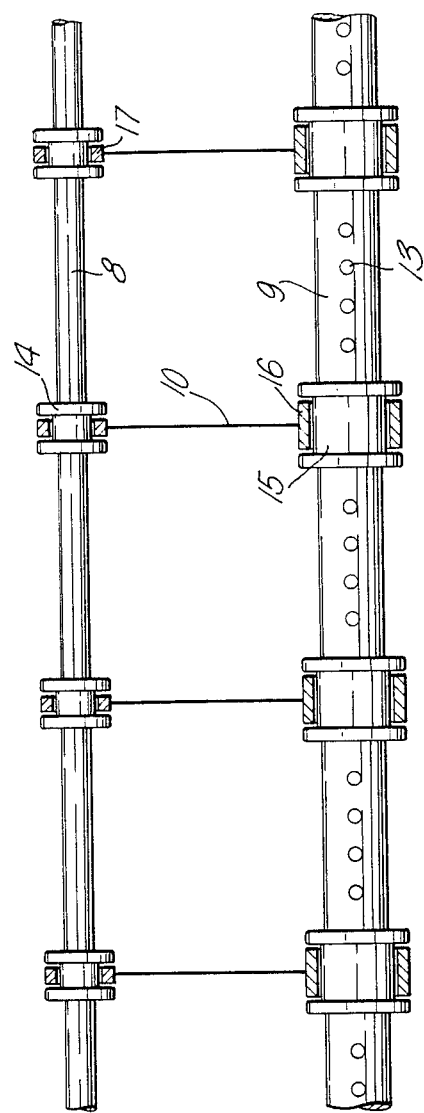

MARINE STREAMER FOR USE IN SEISMIC SURVEYS

BACKGROUND OF THE INVENTION

1. Field of the Invention

The invention relates to a marine streamer for use in seismic exploration, the streamer being suspended from buoyancy means to that it is maintained at a desired distance from the water surface.

2. Description of the Prior Art

In seismic exploration at sea one or a plurality of cables containing seismic energy sources is/are commonly towed behind a seagoing vessel. Pulses emitted by the energy sources are relfected from various layers of the sea floor and recorded by receivers or hydrophones which are also towed in the water and provided in special cables designated as streamers. The cables transmit the reflected and received signals, via various transmitting systems, to a recording unit, generally on board the towing vessel where the signals may be processed or stored in a suitable medium.

In connection with signal reception in the streamer, interference or errors may easily occur due to external circumstances or conditions inside the streamer or connected with transmission. Such interference may, e.g. be due to movement in the sea because of waves which may influence the results because the hydrophones move during reception and have no defined distance from the surface of the water or from the sea floor. These problems may be enhanced by exploration in shallow waters. One concept in this connection is to make the streamers heavier by being supported by buoyancy means which are provided at regular intervals on the streamer by the aid of sturdy suspension ropes. Even though this resulted in more steady movement of the streamer the buoyancy means still move and their forward movement in the water will also cause noise. A possible solution to this problem may be to guide the streamer by the aid of depth fins, so called "birds" which will keep the cable at a controlled depth below the water surface. This concept is, indeed a good solution, but the depth fins involve a complication and additional connection of electronics, also, the streamer must be specially built with properties adapted to this object.

In conection with seismic exploration in areas of shallow water, streamers with positive buoyancy, but provided with chains or the like sliding along the bottom, were used to maintain a defined distance from the bottom. This concept is, however, also burdened with obvious weak points since chains will make heavy noise and may, additionally, fasten on installations on the sea floor.

BRIEF SUMMARY OF THE INVENTION

It is, thus, an object of the present invention to provide a streamer capable of being towed through the water with a minimum of resistance and so "softly" that there is a minimum of noise and interference, at the same time as sources of errors due to changed distance from the sea floor are avoided to a high degree.

Another object of the invention is to provide a streamer which is well suited for use in shallow waters and which may be towed at a defined distance from the surface. Also, the streamer should be so flexible that it may readily be adapted to local conditions also as regards its length and may be relieved of additional equipment.

These objects are achieved by a streamer which is characterized by the features described below.

It should be mentioned that the term streamer in this context is intended to comprise not only the electronic cable for reception and retransmission of signals, but the cable in its widest sense, including, buoyancy means, floats, suspensions, etc., i.e. the members belonging to an operatively functional cable.

The invention provides in a simple manner a cable which may be moved through the water with a minimum of influence from noise generated by movement, at the same time as the streamer cable with its electronic equipment for signal recording may be provided and maintained at the most suitable level above the sea floor, and spaced from the surface. The buoyancy means may, thus, be provided with depth fins intended to ensure stabilization at a desired depth without noise from any possible turbulence near the depth fins being propagated to the signal receiving means to any significant degree. The cable and its buoyancy means may readily be designed as sectional elements to be connected or disconnected in response to local requirements with correct relations between buoyancy means and recording means being maintained at all times. Due to the snake-like design the suspension ropes may be placed independently of fastening means for separate buoyancy means, thus, to be more advantgeously distributed which also permits use of slimmer ropes than was previously possible. It is also advantageous to let the ropes show a certain flexibility.

The concept according to the invention is based on use of snake- or sausage-like, or substantially tubular, slightly flexible buoyancy means of the kind that are also used for towing the seismic sources of energy. This kind of elongated buoyancy means was previously not intended or used for streamer cables which have the same shape per se.

BRIEF DESCRIPTION OF THE DRAWINGS

The invention will be disclosed in more detail below with reference to embodiments illustrated in the drawings, wherein:

FIG. 2 is a partial side elevational view of an embodiment of the connection between the buoyancy means of the streamer and its active part in accordance with the invention.

DETAILED DESCRIPTION

In FIG. 1 three different kinds of known streamers as well as different embodiments of streamers according to the invention are shown. In the figures the towing vessel is designated 1, and the surface of the sea is designated 2. The streamer is generally designated 3 with reference to the definition stated above. At the end of each streamer a tale buoy 11 is provided.

Figure 1A:
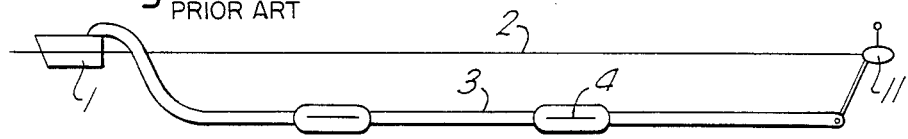
FIGS. 1A-F are schematic views which show various embodiments of streamers, both of a known kind, and according to the invention.

FIG. 1A shows a streamer of the conventional kind which is designed with neutral buoyancy, and with its depth controlled by the aid of depth fins or "birds" 4. The latter will be able to keep the neutral streamer at a certain depth but may generate noise due to their movement as well as due to control/moving components.

Figure 1B:
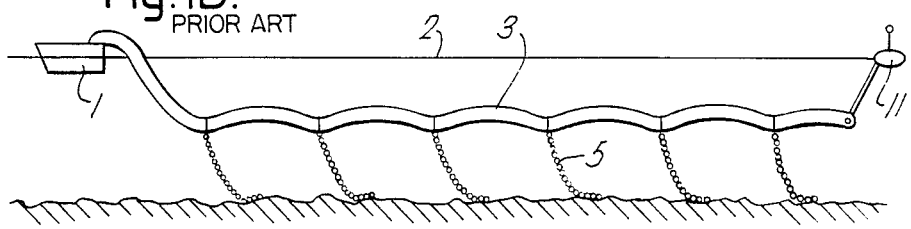
Figure 1C:
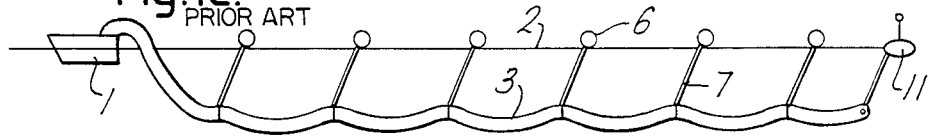

FIG. 1B shows a streamer 3 with positive buoyancy, but being kept at a determined distance from the sea floor by the aid of mounted chains which are towed along the sea floor. This type is intended for use in shallow waters. It will be obvious that such a method will cause noise.

FIG. IC shows a streamer having negative buoyancy, i. e. being heavier than water and being kept afloat by buoys 6 which are provided at a mutual distance and are towed in the water, the buoys being anchored to streamer 3 by sturdy ropes 7. As will appear from FIG. IC the buoys are urged backwards when being towed, and they will cause resistance and noise. FIG. 1E, furthermore, illustrates how such a buoy will perform when the sea is running high. Obviously, this will not provide suitable conditions for exploration.

Figure 1D:
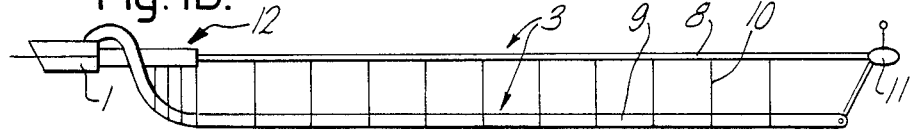
Figure 1E:
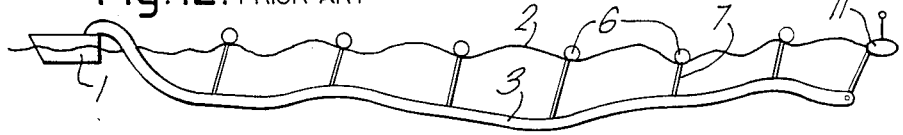

FIG. 1D shows a streamer according to the invention. In this case streamer 3 consists of two members, i.e. the floating member 8 and the active electronic cable 9. According to the invention the buoyancy member is a snake or sausage shaped, or substantially tubular shaped elongated and slightly flexible member. The active cable is made with slightly negative buoyancy and is kept in a desired position by buoyancy member 8, via thin and slightly resilient ropes 10. The two streamer members are brought together in the area adjacent to the towing vessel and in the area about 12 the streamer is also reinforced by shorter spaces between ropes.

If desired, this embodiment may be modified by providing depth fins on buoyancy member 8. This is, indeed, possible due to the special design, since depth fins with their members will be provided at a distance from the active electronic member 9. In this manner the entire streamer with both members may be controlled in a direction downwards or upwards.

Figure 1F:
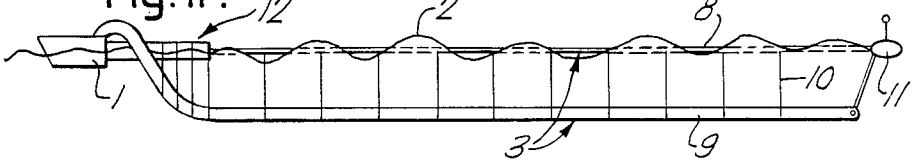

It will appear from FIG. 1F, especially when compared to FIG. 1E, how much more favorable the invention will be in heavy weather. With the elongated buoyancy member the influence of waves will be much reduced, especially because the buoyancy member may be made narrow.

FIG. 2 illustrates how the connection between buoyancy member 8 and active member 9 may be arranged. The buoyancy member 8 may be provided with attachable sleeve-like members, e.g. swivels 14, to which ropes 10 are secured by the aid of rings 17 to have a certain freedom of movement. The active cable member 9 is also provided with sleeve like members 15 having a spool shape and rings or swivels 16 for the ropes. Rings 16 may be wider to distribute the load. In case of a streamer divided into sections, both the buoyancy member and the active member will be divided into sections. The connections between sections may then be protected behind the fastening sleeves 14 and 16, respectively.

It will appear from the above disclosure that many modifications will be possible within the scope of the invention. It is, thus, possible to operate with streamers divided into sections, attachment may be achieved in various manners, the working depth may be adjusted, e.g. by selecting a different rope length from the preferred length of 2-3 meters, and the design of separate members may be varied to a certain degree.

I claim: CLAIMS:

1. A marine streamer for use in seismic exploration comprising:
    a substantially tubular shaped and substantially flexible buoyancy member, having a buoyancy relative to water;
    a streamer cable having a predetermined degree of negative buoyancy for suspension below the surface of the water at a depth greater than said flexible buoyancy member;
    a plurality of pairs of sleeve shaped swivel members mounted on said flexible buoyancy member and said streamer cable, one of the swivel members of each pair being mounted on said flexible buoyancy member and the other swivel member of each pair being mounted on said streamer, said pairs being in relative longitudinal spaced relationship;
    ring members swivelly mounted around said sleeve shaped members; and
    a narrow substantially resilient suspension rope connected to said ring members of each pair of swivel members for suspending said streamer cable from said flexible buoyancy member and maintaining said streamer cable at a predetermined distance from the surface of the water.

2. A marine streamer as claimed in claim 1 wherein:
    said flexible buoyancy member is comprised of buoyancy member sections connected together; and
    said streamer cable is comprised of streamer cable sections connected together.

3. A marine streamer as claimed in claim 1 and further comprising:
    depth fins on said flexible buoyancy member for guiding said flexible buoyancy member under the surface of the water.

4. A marine streamer as claimed in claim 1 wherein:
    said suspension ropes have substantially the same length of two to three meters.

5. A marine streamer as claimed in claim 1 wherein:
    means are provided for adjusting the depth of said streamer cable relative to said flexible buoyancy member.

6. A marine streamer as claimed in claim 1 wherein:
    means are provided for adjusting the depth of said flexible buoyancy member and said streamer cable.

7. A marine streamer as claimed in claim 6 wherein:
    said sleeve shaped swivel members comprise spool shaped members.

8. A marine streamer as claimed in claim 7 and further comprising:
    depth fins on said flexible buoyancy member for guiding said flexible buoyancy member under the surface of the water.

9. A marine streamer as claimed in claim 8 wherein:
    said suspension ropes have substantially the same length of two to three meters.

10. A marine streamer as claimed in claim 7 wherein:
    means are provided for adjusting the depth of said flexible buoyancy member and said streamer cable.

* * * * *